(12) United States Patent
Bonebright et al.

(10) Patent No.: US 9,431,687 B2
(45) Date of Patent: Aug. 30, 2016

(54) HEATING ASSEMBLIES AND SYSTEMS FOR RECHARGEABLE BATTERIES

(71) Applicant: Laird Technologies, Inc., Earth City, MO (US)

(72) Inventors: Ronald James Bonebright, Lincoln, NE (US); Robert Jacek Slawinski, Lincoln, NE (US); Augustine Odili Ekeinde, San Jose, CA (US)

(73) Assignee: Laird Technologies, Inc., Earth City, MO (US)

( * ) Notice: Subject to any disclaimer, the term of this patent is extended or adjusted under 35 U.S.C. 154(b) by 172 days.

(21) Appl. No.: 14/188,372

(22) Filed: Feb. 24, 2014

(65) Prior Publication Data

US 2015/0244040 A1 Aug. 27, 2015

(51) Int. Cl.
*H05B 1/00* (2006.01)
*H01M 10/657* (2014.01)
(Continued)

(52) U.S. Cl.
CPC ......... *H01M 10/657* (2015.04); *H01M 10/486* (2013.01); *H01M 10/63* (2015.04); *H02J 7/00* (2013.01); *H02J 7/0029* (2013.01)

(58) Field of Classification Search
CPC .................. H01M 2250/20; H01M 2200/103; H01M 2200/10; H01M 2200/20; H01M 10/657; H01M 10/486; H01M 10/63; H01M 10/485; H01M 10/425; H01M 10/44; H01M 10/441; H01M 10/6571; H01M 10/643; H01M 10/4285; H01M 10/0525; H01M 10/4207; H01M 10/625; H01M 10/615; H01M 10/637; H01M 10/6561; H01M 10/4271; H01M 10/4278; B60L 3/0046; B60L 3/12; B60L 11/875; B60L 2240/662; H02J 7/00; H02J 7/0029
See application file for complete search history.

(56) References Cited

U.S. PATENT DOCUMENTS 4,441,017 A * 4/1984 Sorlien .................... H05B 3/56
156/499
6,002,240 A * 12/1999 McMahan ......... H01M 10/4257
320/150

(Continued)

FOREIGN PATENT DOCUMENTS

CA 2538817 9/2007
CA 2553057 1/2012

OTHER PUBLICATIONS

Thermal Circuits; Avionics, Aerospace and Military; http://www.thermalcircuits.com/Markets/avionics.html; Feb. 4, 2014;1 page.

*Primary Examiner* — Shawntina Fuqua
(74) *Attorney, Agent, or Firm* — Harness, Dickey & Pierce, P.L.C.; Anthony Fussner (57) ABSTRACT

Heating assemblies for one or more rechargeable batteries include a flexible heating element positionable about the one or more rechargeable batteries, a temperature sensor configured to sense a temperature adjacent the one or more rechargeable batteries, and a control circuit configured to receive the sensed temperature from the temperature sensor. The control circuit is configured to connect the charger to the flexible heating element for allowing power to flow from the charger to the flexible heating element in response to the sensed temperature adjacent the one or more rechargeable batteries falling below a defined threshold temperature. The temperature sensor is adjacent the flexible heating element. The flexible heating element is configured to receive power from a charger that is operable for charging the one or more rechargeable batteries. Systems including the one or more heating assemblies are also disclosed.

20 Claims, 9 Drawing Sheets

(51) Int. Cl.
*H01M 10/48* (2006.01)
*H02J 7/00* (2006.01)
*H01M 10/63* (2014.01)

(56) References Cited

U.S. PATENT DOCUMENTS

| | | |
|---|---|---|
| 6,624,615 B1 | 9/2003 | Park |
| 6,686,080 B2 | 2/2004 | Farkash et al. |
| 7,045,234 B2 | 5/2006 | Mardilovich et al. |
| 7,192,666 B2 | 3/2007 | Calhoon |
| 7,670,701 B2 | 3/2010 | Calhoon |
| 7,767,352 B2 | 8/2010 | Wake et al. |
| 8,084,154 B2 | 12/2011 | Scheucher |
| 8,288,045 B2 | 10/2012 | Calhoon |
| 8,367,973 B2 | 2/2013 | Suzuki et al. |
| 8,574,738 B2 | 11/2013 | Fattig |
| 2011/0117463 A1 | 5/2011 | Lienkamp et al. |
| 2013/0161310 A1 | 6/2013 | Kinoshita et al. |

\* cited by examiner

HEATING ASSEMBLIES AND SYSTEMS FOR RECHARGEABLE BATTERIES

FIELD

The present disclosure relates to heating assemblies and systems for rechargeable batteries.

BACKGROUND

This section provides background information related to the present disclosure which is not necessarily prior art.

Rechargeable batteries may be used in numerous devices and exposed to a wide variety of temperatures. If a rechargeable battery is exposed to low temperatures, the battery may lose battery capacity, have difficulty recharging, etc. In some cases, heaters may be employed to maintain a sufficient temperature around a rechargeable battery. The heaters may be powered by the rechargeable battery which it is heating or another external power source not associated with the rechargeable battery.

SUMMARY

This section provides a general summary of the disclosure, and is not a comprehensive disclosure of its full scope or all of its features.

According to aspects of the present disclosure, heating assemblies for one or more rechargeable batteries are disclosed. In an exemplary embodiment, a heating assembly generally includes a flexible heating element positionable about the one or more rechargeable batteries. The flexible heating element is configured to receive power from a charger that is operable for charging the one or more rechargeable batteries. The heating assembly further includes a temperature sensor configured to sense a temperature adjacent the one or more rechargeable batteries, and a control circuit configured to receive the sensed temperature from the temperature sensor. The control circuit is configured to connect the charger to the flexible heating element for allowing power to flow from the charger to the flexible heating element in response to the sensed temperature adjacent the one or more rechargeable batteries falling below a defined threshold temperature. The temperature sensor is adjacent the flexible heating element.

Systems are disclosed according to other aspects of the present disclosure. In an exemplary embodiment, a system generally includes one or more rechargeable batteries, one or more flexible heating elements positionable about the one or more rechargeable batteries, a temperature sensor configured to sense a temperature adjacent the one or more rechargeable batteries, a charger configured to provide power to the one or more rechargeable batteries and the one or more flexible heating elements, and a control circuit configured to receive the sensed temperature from the temperature sensor. The control circuit is configured to connect the charger to the flexible heating element to thereby allow power to flow from the charger to the flexible heating element in response to the sensed temperature adjacent the one or more rechargeable batteries falling below a defined threshold temperature. The temperature sensor is adjacent the flexible heating element.

According to further aspects of the present disclosure, methods of heating one or more rechargeable batteries chargeable by a charger are disclosed. In an exemplary embodiment, a method generally includes sensing temperature adjacent the one or more rechargeable batteries, and allowing power to flow from the charger to a flexible heating element positioned about the one or more rechargeable batteries in response to the sensed temperature adjacent the one or more rechargeable batteries falling below a defined threshold temperature.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Figure 1:
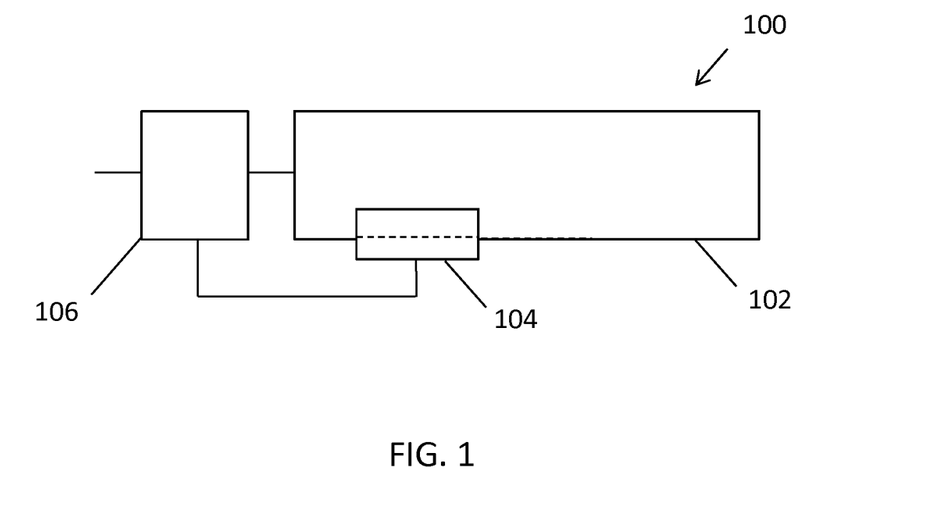
FIG. 1 is a block diagram of a heating assembly including a flexible heating element, a temperature sensor, and a control circuit according to an example embodiment of the present disclosure.

FIG. 1 illustrates a heating assembly 100 for one or more rechargeable batteries according to one example embodiment of the present disclosure. As shown in FIG. 1, the heating assembly 100 includes a flexible heating element 102 positionable about one or more rechargeable batteries (not shown in FIG. 1) and a temperature sensor 104 configured to sense a temperature adjacent the one or more rechargeable batteries. The temperature sensor 104 is positioned adjacent the flexible heating element 102. The heating assembly 100 further includes a control circuit 106 configured to receive the sensed temperature from the temperature sensor 104 and connect a charger to the flexible heating element 102 for allowing power to flow from the charger to the flexible heating element 102 in response to the sensed temperature adjacent the one or more rechargeable batteries falling below a defined threshold temperature. The flexible heating element 102 may then receive the power and start to generate or produce heat.

Maintaining and/or stabilizing the temperature adjacent the batteries above a defined threshold temperature may extend the battery life of each battery. For example, some batteries (e.g., Li-Ion batteries, NiMH batteries, sealed lead acid batteries, etc.) may lose capacity, be difficult to charge, etc. when exposed to low temperatures. Thus, by ensuring the temperature around a battery or batteries (e.g., internal temperature of a battery pack including two or more batteries) is above a particular temperature, the batteries may experience a better charge, maintain capacity, etc. and thus the batteries may have an extended battery life.

Figure 2:
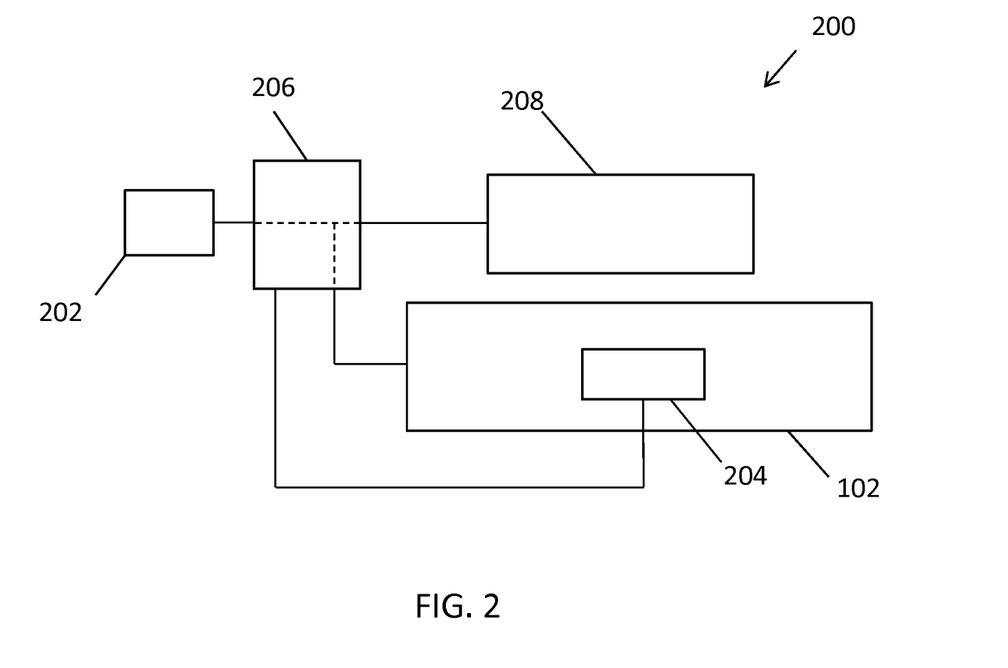
FIG. 2 is a block diagram of a system including a heating assembly having a flexible heating element, and a charger for providing power to the flexible heating element according to another example embodiment.

The flexible heating element 102 receives power from a charger that also charges the one or more rechargeable batteries. For example, FIG. 2 illustrates a system 200 including the flexible heating element 102 (as explained above with reference with FIG. 1), a temperature sensor 204, a control circuit 206 and a charger 202 for providing power to one or more rechargeable batteries 208 and the flexible heating element 102. Thus, the system 200 includes one power source for both charging (e.g., initially charging, recharging, etc.) the batteries 208 and/or powering the flexible heating element 102 to maintain a temperature above a defined threshold temperature.

The control circuit 206 may be coupled in series between the charger 202 and the rechargeable batteries 208. Alternatively, the control circuit 206 may be coupled between the charger 202 and the batteries 208, to the charger 202, etc. in another suitable manner. Additionally, the control circuit 206 may be a control circuit for the charger 202 in addition to a control circuit for the flexible heating element 102.

In the example of FIG. 2, if the sensed temperature from the temperature sensor 204 falls below the defined threshold temperature, the control circuit 206 may connect the charger 202 to the flexible heating element 102 allowing power to flow from the charger 202 to the flexible heating element 102. The flexible heating element 102 may receive the power and start to generate or produce heat. In some embodiments, if the sensed temperature from the temperature sensor 204 falls below the defined threshold temperature, the control circuit 206 may be powered on to connect the charger 202 to the flexible heating element 102. In other examples, the control circuit 206 may control a switch coupled between the charger 202 and the flexible heating element 102 to connect the charger and the flexible heating element.

If the sensed temperature from the temperature sensor 204 rises above the defined threshold temperature, the control circuit 206 may disconnect the charger 202 from the flexible heating element 102. In this case, no power is provided to the flexible heating element 102 and instead the charger 202 only provides power to the rechargeable batteries 208. In some examples, the control circuit 206 may become idle (e.g., powered off, in a sleep mode, etc.) and thus disconnect the charger 202 from the flexible heating element 102. In other examples, the control circuit 206 may control a switch coupled between the charger 202 and the flexible heating element 102 to disconnect the charger and the flexible heating element.

Alternatively, the control circuit 206 may disconnect the charger 202 from the flexible heating element 102 in response to the sensed temperature adjacent the rechargeable batteries 208 rising above a different defined threshold temperature. For example, the control circuit 206 may connect the charger 202 to the flexible heating element 102 allowing power to flow from the charger 202 to the flexible heating element 102 if the sensed temperature falls below about negative five degrees Celsius. The control circuit 206 may then disconnect the charger 202 from the flexible heating element 102 after the sensed temperature rises above about zero degrees Celsius. Thus, the control circuit 206 may connect the charger 202 to the flexible heating element 102 at one defined threshold temperature so that the flexible heating element 102 generate heat and disconnect the charger 202 from the flexible heating element 102 at another defined threshold temperature so that the flexible heating element 102 stops generating heat.

As shown in FIG. 2, the temperature sensor 204 is positioned adjacent the center portion of the flexible heating element 102. Alternatively, a temperature sensor may be positioned at another suitable location including, for example, near a corner of a flexible heating element, etc. For example, FIG. 1 shows the temperature sensor 104 near a corner of the flexible heating element 102 and extending beyond the edge of the flexible heating element 102. In other embodiments, the temperature sensor 104 may not extend beyond the edge of the flexible heating element 102.

The location of a temperature sensor may be based on one or more factors including, for example, thermal characteristics of a case including the batteries, the number of batteries, the size of the batteries, the size of a case including the batteries, the size of the flexible heating element, the number of temperature sensors employed (explained below), etc.

Additionally, although FIGS. 1 and 2 illustrate one temperature sensor, more than one sensor may be employed in other exemplary embodiments. Further, the temperature sensors may be positioned on the same or opposing sides of a flexible heating element. For example, one temperature sensor may be positioned near a center portion on one side of a flexible heating element while another temperature sensor may be positioned near a center portion on the opposing side of the flexible heating element. Alternatively, one temperature sensor may be positioned near a corner of a flexible heating element while another temperature sensor may be positioned near an opposing corner (on the same side) of the flexible heating element.

In some embodiments, the heating assembly 100 and/or the system 200 may include one or more heat spreaders adjacent the flexible heating element 102 for spreading heat about the batteries. For example, FIG. 3 illustrates a heating assembly 300 including the flexible heating element 102 and the temperature sensor 104 of FIG. 1 as well as a heat spreader 302.

Figure 3:
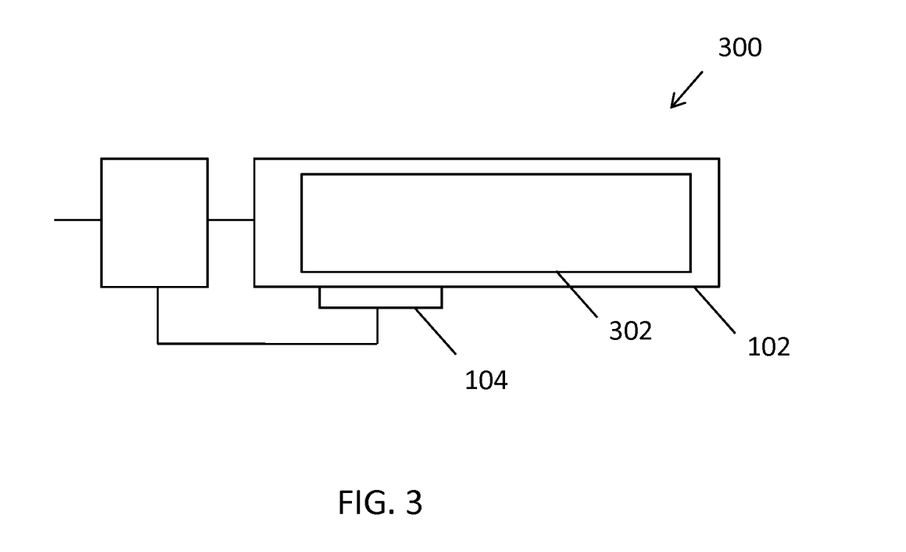
FIG. 3 is a block diagram of a heating assembly including a flexible heating element, a temperature sensor, a control circuit, and a heat spreader according to yet another example embodiment.

As shown in FIG. 3, the heat spreader 302 is positioned on a side of the flexible heating element 102 opposite the temperature sensor 104. Alternatively, the heat spreader 302 may be positioned on, near, etc. any other suitable side of the flexible heating element 102 including, for example, the same side of the flexible heating element as the temperature sensor 104. Thus, the heat spreader 302 may be positioned adjacent to one side of the flexible heating element 102.

Additionally, although FIG. 3 illustrates one heat spreader 302, more than one heat spreader may be employed in other exemplary embodiments. For example, one or more heat spreaders may be positioned on, near, etc. one or more sides of the flexible heating element 102.

In some embodiments, the heat spreader 302 and/or other heat spreaders may include aluminum (e.g., aluminum and/or an aluminum alloy). Alternatively, the heat spreader 302 and/or other heat spreaders may include any other suitable flexible material for spreading heat including, for example, graphite, copper, etc.

Further, the heat spreader 302 and/or other heat spreaders may be about 0.003 inches thick. The heat spreader 302 and/or other heat spreaders may have any suitable dimensions based on available space, specific thermal characteristics, material, etc.

Figure 4:
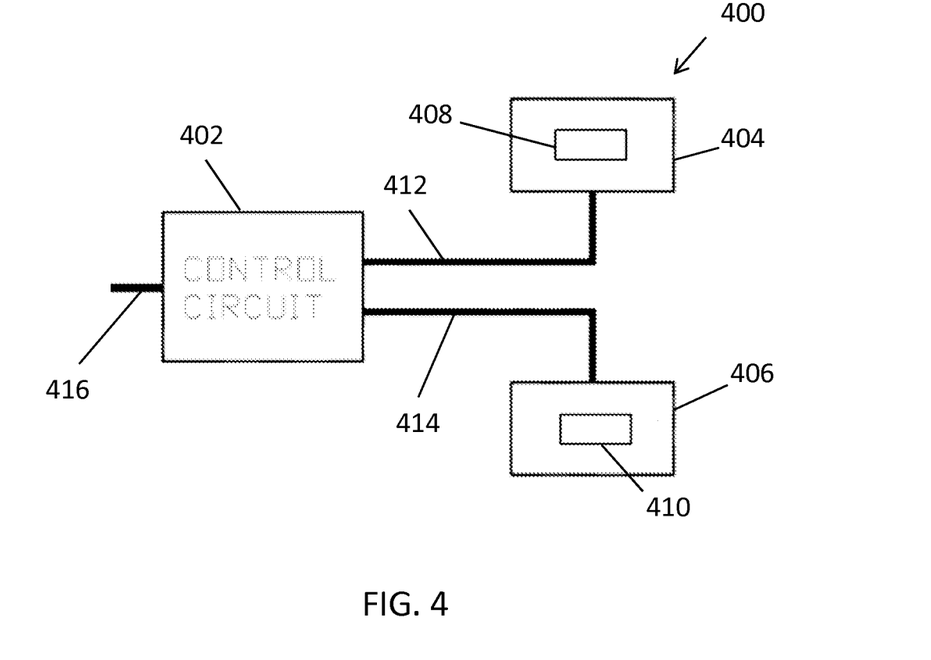
FIG. 4 is a block diagram of a control circuit, two flexible heating elements and two temperature sensors according to a further example embodiment.

FIG. 4 illustrates an example block diagram of a system 400 including a control circuit 402 coupled to two flexible heating elements 404, 406 and two temperature sensors 408, 410. The flexible heating elements 404, 406 and the temperature sensors 408, 410 may be similar to the other flexible heating elements and temperature sensors disclosed herein.

The control circuit 402 of FIG. 4 is a dual (e.g., two) channel controller for controlling power to the flexible heating elements 404, 406. Although FIG. 4 illustrates a dual channel controller and two flexible heating elements 404, 406, the control circuit 402 may include more or less channels for powering more or less flexible heating elements in other exemplary embodiments. Additionally and/or alternatively, the control circuit 402 which includes the dual channel controller may control power to more than two heating elements.

As shown in FIG. 4, the flexible heating element 404 is coupled to the control circuit 402 via a cable 412 while the flexible heating element 406 is coupled to the control circuit 402 via a cable 414. In some preferred embodiments, each cable 412, 414 includes a four wire cable assembly having a cable termination on each end. One or both of the cable terminations may be a single row, surface mount, pin header connector. Alternatively, the cable 412 and/or the cable 414 may include more or less wires (if desired) and/or have a different termination configuration (e.g., two rows, etc.), connector, etc.

Additionally, the control circuit 402 may include a termination to receive the cable terminations. For example, the control circuit termination may include an exposed double row header having 8 connection points (e.g., pins, etc.). One row of four connection points may be for the cable termination of cable 412 while the other row of four connection points may be for the cable termination of cable 414. Alternatively, the control circuit termination may include any other suitable configuration/connector without departing from the scope of the present disclosure.

In the example of FIG. 4, the control circuit 402 may be coupled to a charger (not shown) via a power cable 416. The control circuit 402 of FIG. 4 is configured to receive 24 VDC/10 W from the charger and provide 24 VDC/5 W to flexible heating elements 404, 406. Alternatively, the control circuit 402 may receive and provide any other suitable DC voltage and/or power.

Figure 5:
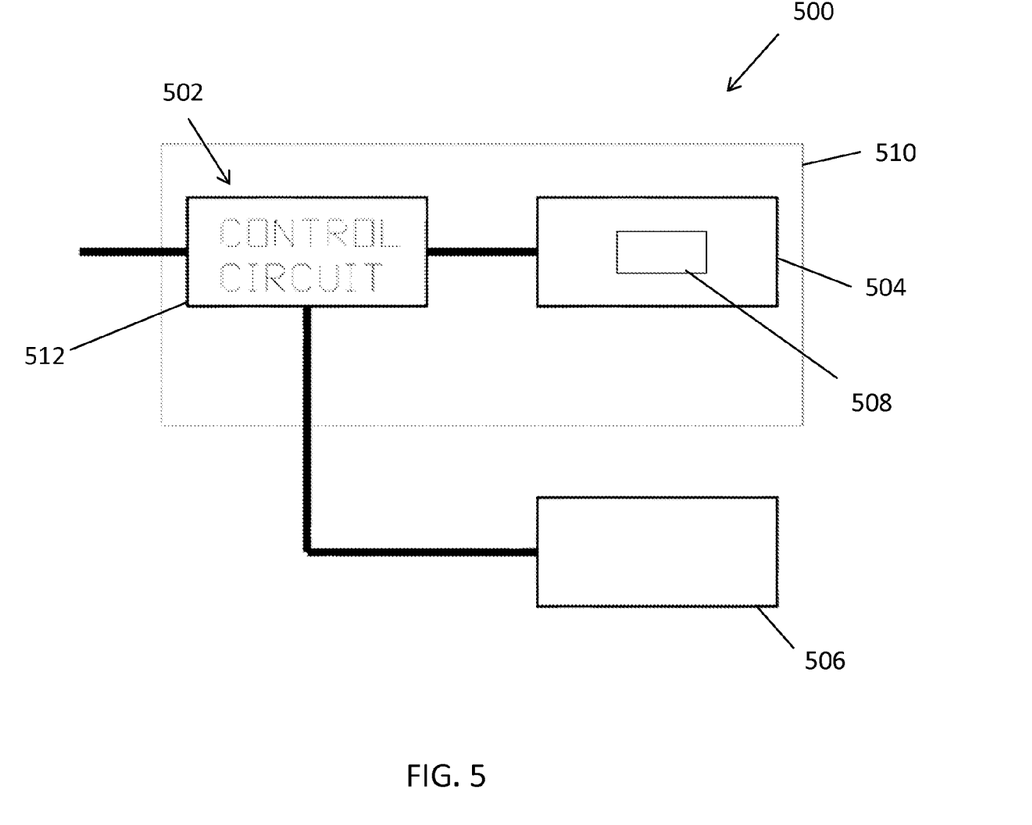
FIG. 5 is a block diagram of a control circuit, two flexible heating elements and one temperature sensor according to an additional example embodiment.

FIG. 5 illustrates another example system 500 including a heating assembly 510 and a flexible heating element 506. The heating assembly 510 may be similar to the heating assembly 100 described above with reference to FIG. 1. For example and as shown in FIG. 5, the heating assembly 510 includes a flexible heating element 504, a temperature sensor 508, and a control circuit 502 coupled to the flexible heating element 504 and the temperature sensor 508. Similar to other control circuits disclosed herein, the control circuit 502 may receive a sensed temperature from the temperature sensor 508 and connect a charger (not shown) to the flexible heating element 504 allowing power to flow from the charger to the flexible heating element 504 in response to the sensed temperature falling below a defined threshold temperature.

The control circuit 502 may also connect the charger to the flexible heating element 506. For example, because a temperature sensor is not positioned adjacent the flexible heating element 506, the control circuit 502 may connect the charger to the flexible heating element 506 in response to the sensed temperature (from the temperature sensor 508) falling below the defined threshold temperature. Thus, the flexible heating element 506 may be powered (e.g., turned on to generate heat) based on a sensed temperature adjacent rechargeable batteries not associated with the flexible heating element 506. Accordingly, the heating assembly 510 may provide control and temperature sensing for the flexible heating element 506.

In the example of FIG. 5, the flexible heating element 504 and the flexible heating element 506 may receive power from separate outputs of the control circuit 502. Thus, the control circuit 502 may be a dual channel controller as explained above.

Alternatively, the flexible heating element 504 and the flexible heating element 506 may receive power from the same output of the control circuit 502. In this way, the flexible heating element 506 may be coupled in series with the flexible heating element 504. Thus, the control circuit 502 may be a single channel controller for powering the elements 504, 506.

In some embodiments, the system and/or the heating assembly may include a case for retaining a control circuit. For example and as shown in FIG. 5, a case 512 may be provided for retaining the control circuit 502. Preferably, the control circuit 502 is potted (e.g., epoxy potted, etc.) in the case 512. Alternatively, the control circuit 502 may be secured, protected, etc. within the case 512 in another suitable manner.

Additionally, the case 512 of FIG. 5 may have any suitable dimension. For example, the case 512 may be approximately one inch (1.0") by one and half inch (1.5") by half inch (0.5").

Further, the case 512 (including the control circuit 502) may be positioned adjacent rechargeable batteries (not shown). Alternatively, the case 512 may be positioned at any other suitable location. Additionally and/or alternatively, the case 512 and/or the control circuit 502 (without the case 512) may be enclosed within an enclosure housing rechargeable batteries.

Figure 6:
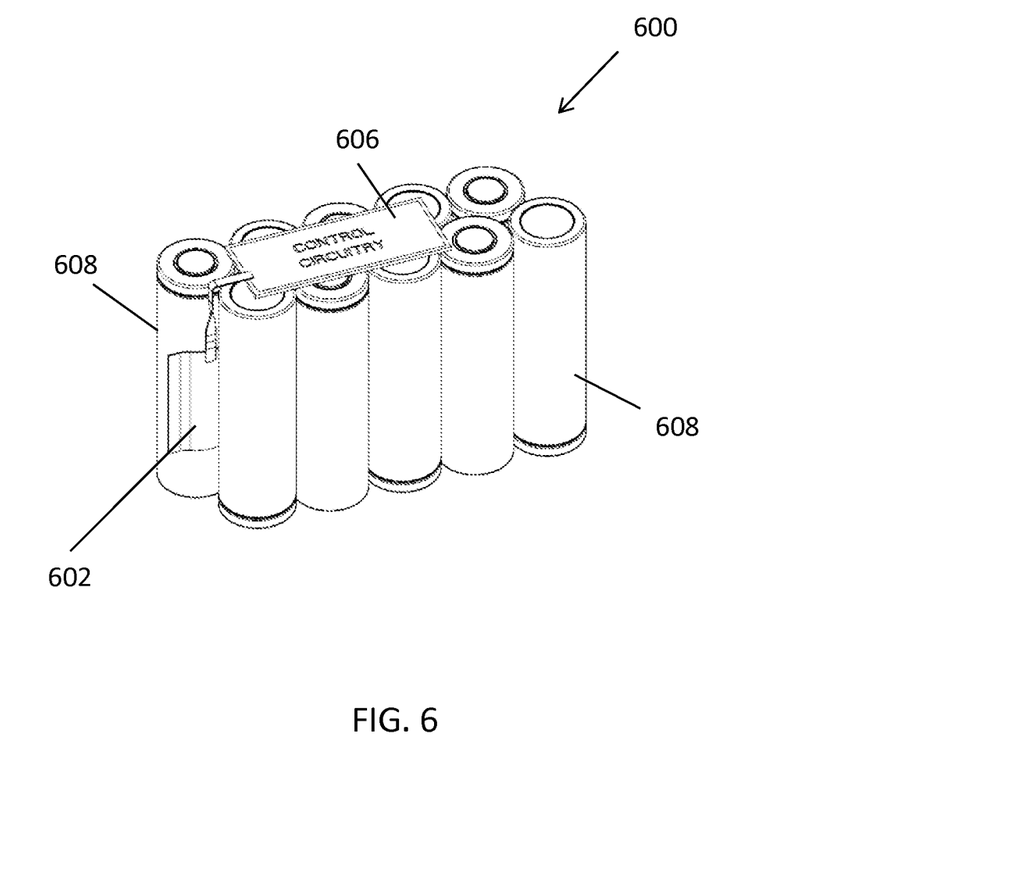
FIG. 6 is an isometric view of a system including control circuitry, a flexible heating element, and rechargeable batteries according to another example embodiment.

FIG. 6 illustrates a system 600 including rechargeable batteries 608 and a heating assembly for maintaining and/or stabilizing a temperature adjacent the rechargeable batteries 608. In some embodiments, if the sensed temperature adjacent the rechargeable batteries should fall below the threshold temperature, the heating assembly may be operable for increasing or raising the temperature adjacent the rechargeable batteries until the sensed temperature is at or exceeds the threshold temperature.

As shown in FIG. 6, the heating assembly includes a flexible heating element 602 positioned about the rechargeable batteries 608 and a control circuitry 606 positioned on top of the batteries 608. The control circuitry 606 is configured to receive a sensed temperature from a temperature sensor (not shown) and provide power to the flexible heating element 602 in response to the sensed temperature adjacent the rechargeable batteries 608 falling below a defined threshold temperature.

In some embodiments, a control circuit for a charger and a control circuit for flexible heating element(s) may be on the same circuit board (e.g., a printed circuit board, etc.). For example, the control circuitry 606 of FIG. 6 may be placed on one printed circuit board and include a control circuit for a charger providing power to recharge the batteries 608 and a control circuit for connecting the charger to the flexible heating element 602.

As shown in FIG. 6, the system 600 includes ten rechargeable batteries 608 grouped (e.g., arranged in two rows of five batteries) to form a battery pack. In other exemplary embodiments, a battery pack may include a different configuration (e.g., more or less rows, etc.), differently shaped or sizes of batteries, etc.), more or less batteries, etc.

If the rechargeable batteries 608 are arranged in two or more rows, the flexible heating element 602 may be positioned between rows of batteries as shown in FIG. 6. Thus, one flexible heating element 602 may be employed to maintain and/or stabilize a temperature adjacent the rechargeable batteries 608. Alternatively, the flexible heating element 602 may be wrapped about the rechargeable batteries 608 in another suitable manner including, for example, around the exterior of the battery pack, interwoven between one or more of the rechargeable batteries 608, etc.

Figure 7A:
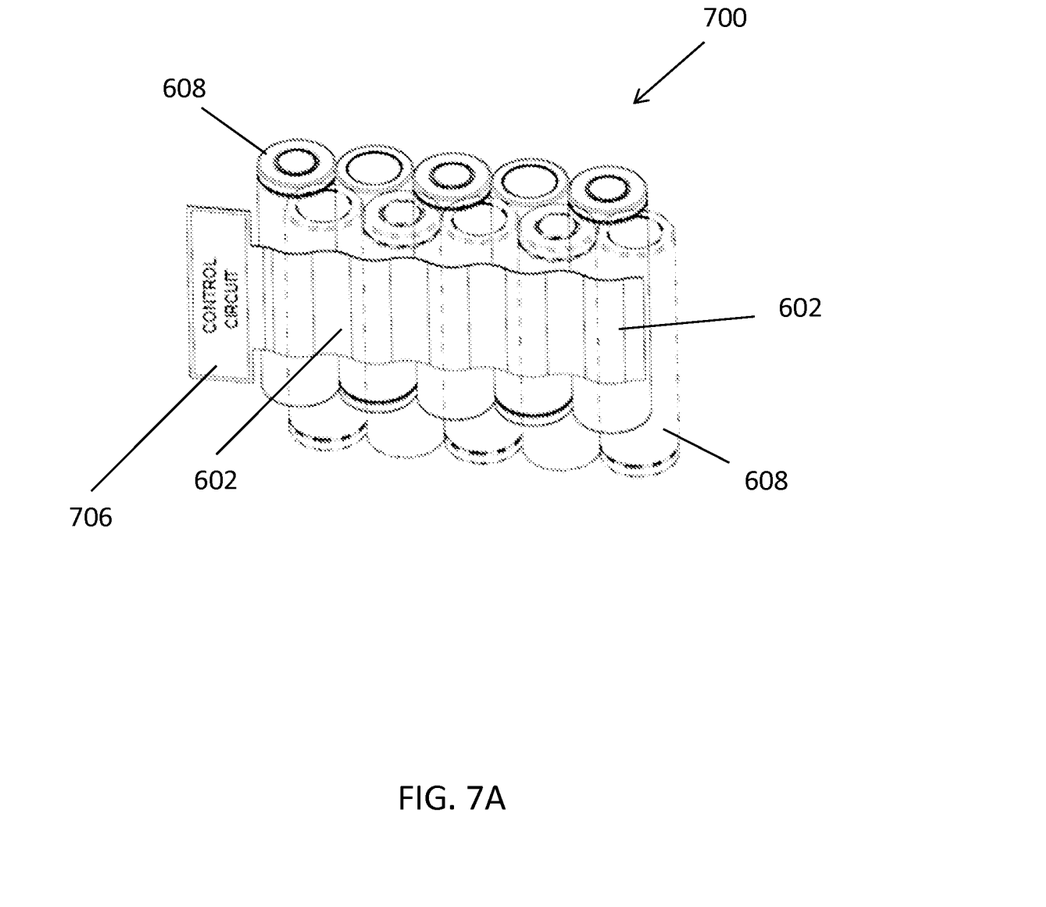
FIG. 7A is isometric view of a system including rechargeable batteries, a flexible heating element and a control circuit according to yet another example embodiment.
Figure 7B:
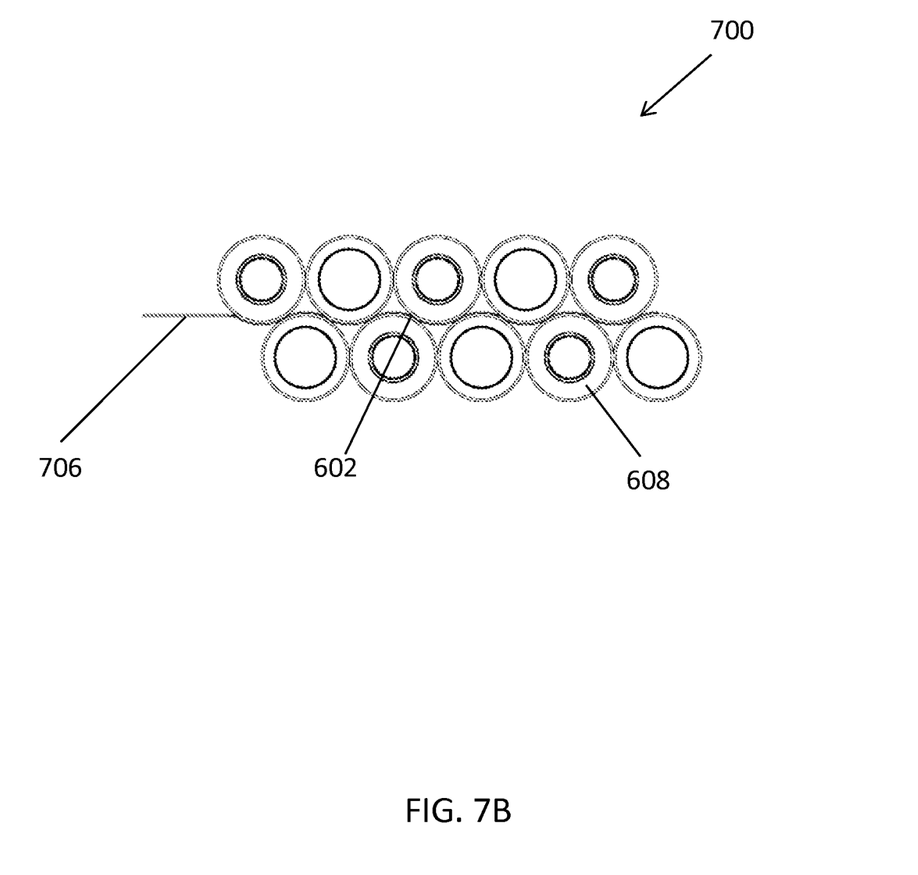
FIG. 7B is a top view of the system of FIG. 7A.
Figure 7C:
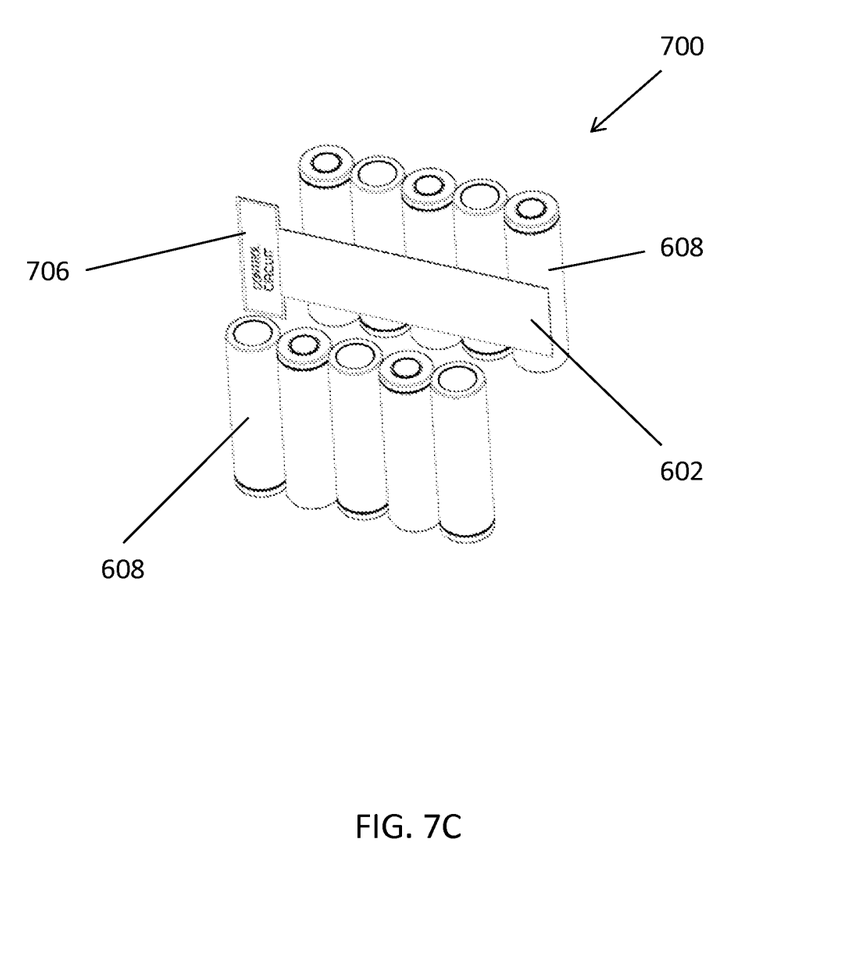
FIG. 7C is an exploded isometric view of the system of FIG. 7A.

FIGS. 7A, 7B, and 7C illustrate another example system 700 including the rechargeable batteries 608 and the flexible heating element 602 of FIG. 6 as well as a control circuit 706 coupled to the flexible heating element 602. As shown in FIGS. 7A, 7B, and 7C, the control circuit 706 is positioned along a side of two of the rechargeable batteries 608. Alternatively, the control circuit 706 may be positioned at another suitable location including, for example, on top of the batteries 608, along another side of the batteries, below the batteries, etc.

Figure 8A:
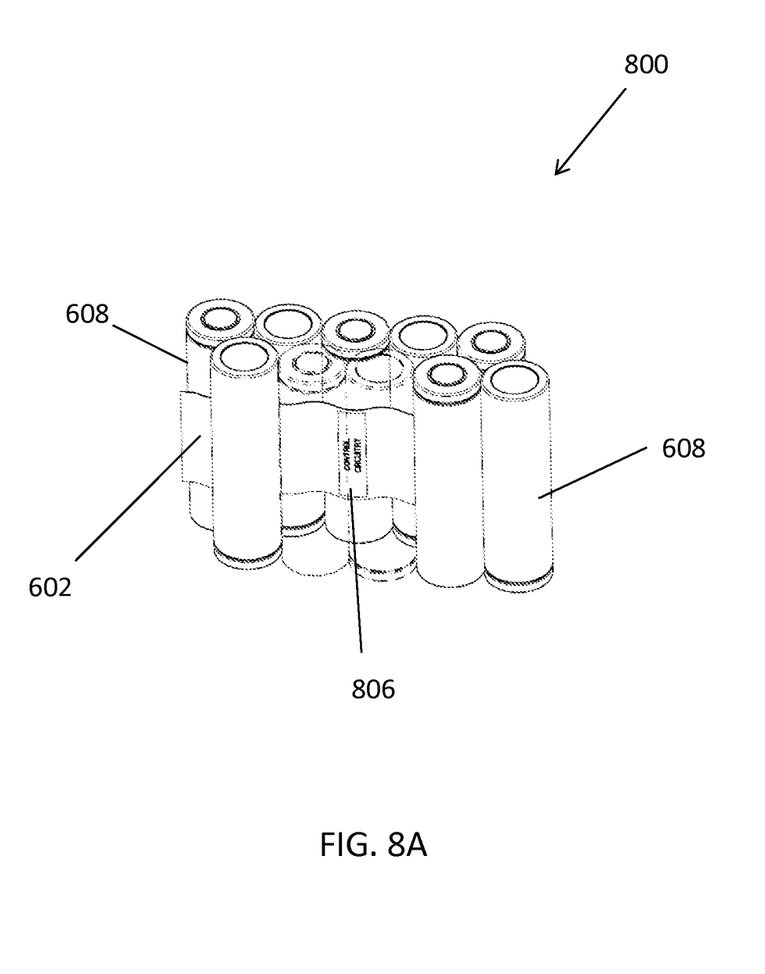
FIG. 8A is an isometric view of a system including rechargeable batteries, a flexible heating element and a control circuit according to another example embodiment.
Figure 8B:
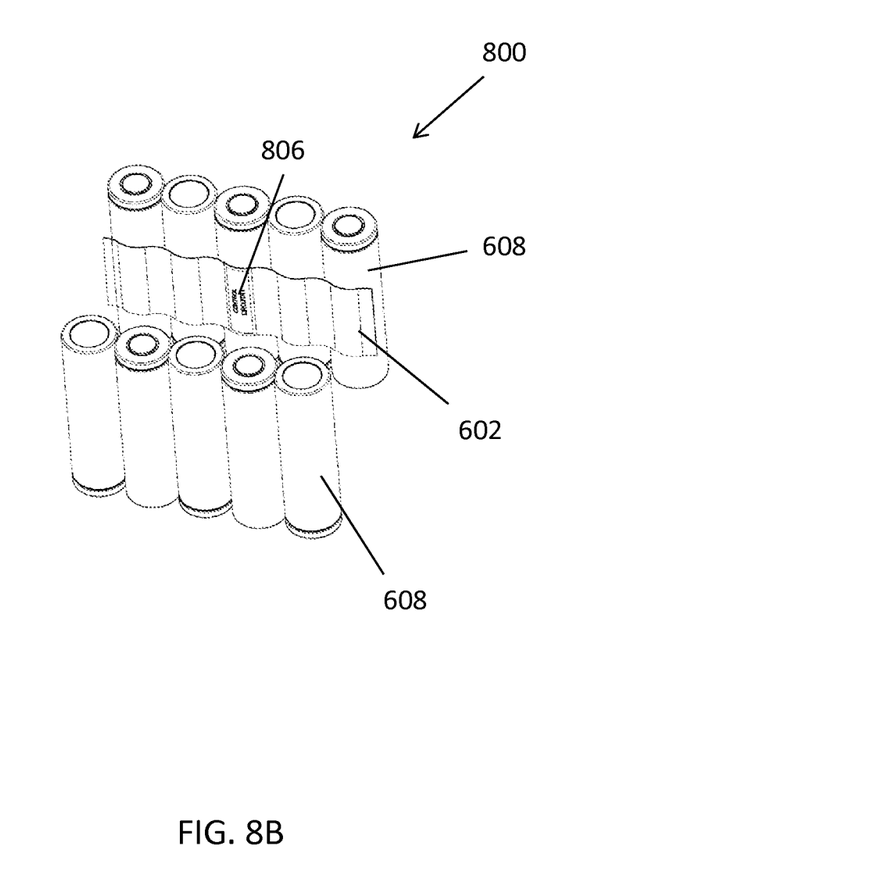
FIG. 8B is an exploded isometric view of the system of FIG. 8A.

FIGS. 8A and 8B illustrate an example system 800 including the rechargeable batteries 608 and the flexible heating element 602 of FIG. 6 as well as a control circuit 806 coupled to the flexible heating element 602. As shown in FIGS. 8A and 8B, the control circuit 806 is positioned adjacent a center portion of the flexible heating element 602. Thus, the control circuit 806 of FIGS. 8A-B is positioned within the battery pack.

Although not shown in FIGS. 7A, 7B, 7C, 8A, and 8B, the systems 700, 800 include a temperature sensor positioned adjacent a center portion of the flexible heating element 602. Alternatively, the temperature sensor may be positioned at, near, etc. another suitable location(s) as explained above.

In some embodiments, the temperature sensor may be part of a control circuit. For example, the control circuit 806 of FIG. 8 may include a temperature sensor for sensing the temperature adjacent the rechargeable batteries 608.

Further, although FIGS. 7A, 7B, 7C, 8A, and 8B illustrate the flexible heating element 602 extending from one end of the battery pack to an opposing end of the battery pack. The flexible heating element 602 may extend less than the entire length of the battery pack or more than the entire length of the battery pack (e.g., to extend around the exterior of the battery pack, etc.) in other exemplary embodiments.

The flexible heating elements disclosed herein may include a polyimide insulated heater having a width of about 0.7 inches, a length of about four inches and a thickness of about 0.02 inches. Alternatively, the flexible heating elements may include any other suitable material and/or have any other suitable dimensions. For example, particular dimensions of the flexible heating elements may be based on how many batteries (e.g., one or more) are present, the size of the batteries, the size of a case including the batteries, etc.

Additionally, the flexible heating elements may include adhesive on one or more surfaces for coupling the flexible heating element(s) to one or more batteries, battery packs, etc. For example, the adhesive may be a pressure sensitive adhesive (PSA) or another suitable adhesive.

In some examples, the flexible heating elements may be a 24 VDC/5 W (128.0 ohm+/−10%) heating element. Alternatively, the flexible heating elements may have any other suitable electrical characteristics. Further, the flexible heating elements may be designed to meet Underwriters Laboratories (UL) standards.

The temperature sensors disclosed herein may be any suitable temperature sensor. For example, the temperature sensors may include a surface mount device (SMD), etc. In some preferred embodiments, the sensor may be a 0402 (0.039 inches by 0.020 inches) surface mount temperature sensor having a resistance of 10 k ohm (+/−1% tolerance) at 25 degrees Celsius. Additionally, the temperature sensors disclosed herein may include a protective coating. For example, a protective potting may substantially cover all or some of one or more temperature sensors.

The defined threshold temperatures disclosed herein may be any suitable temperature, e.g., depending on the particular application and battery type, etc. For example, the defined threshold temperature (e.g., a set point) may be about negative five degrees Celsius, about zero degrees Celsius, about five degrees Celsius, etc. In other examples, the defined threshold temperature used by the control circuits to connect the charger to the one or more flexible heating elements may be about zero degrees Celsius while the defined threshold temperature used by the control circuits to disconnect the charger from the one or more flexible heating elements may be about five degrees Celsius. Additionally, the defined threshold temperatures may include hysteresis for preventing a control circuit from powering on and/or off frequently.

Alternatively, the defined threshold temperature may be in a range from between about negative five degrees Celsius and about zero degrees Celsius. In other embodiments, the defined threshold temperature may change from one value to another (e.g., may be variable). For example, the defined threshold temperature may initially be set to about negative five degrees Celsius and at a later time (or upon a triggering event, etc.) the defined threshold temperature may change to about negative zero degrees.

The control circuits disclosed herein may be any suitable control circuit. For example, the control circuits may include an analog control circuit, a digital control circuit (e.g., a digital signal processor (DSP), a microprocessor, a microcontroller, etc.), or a hybrid control circuit (e.g., a digital control circuit and an analog control circuit). For example, the defined threshold temperatures disclosed herein may be programmed into the digital control circuit. Additionally, the entire control circuit, some of the control circuit, or none of the control circuit may be an integrated circuit (IC).

Additionally, the control circuits may be a one channel, solid state controller if the control circuits are controlling one heating element. Alternatively, the control circuits may be a two (or more) channel, solid state controller if the control circuits are controlling two (or more) heating elements. Further, the control circuits may be designed to meet UL standards.

Further, the control circuits disclosed herein may have a control accuracy of about +/−two degrees Celsius. For example, the defined threshold temperature may be set to zero degrees Celsius. Thus, a control circuit may be powered on/off when the sensed temperature falls within about two degrees Celsius to about negative two degrees Celsius. Alternatively, the control accuracy may be any other suitable value.

The cables between the control circuits and the flexible heating elements may be designed to meet UL standards and include wire, ribbon cables, etc. In some embodiments, the cables may be about eight inches long. Any other suitable cable length may be employed including, for example, cable lengths of more or less than eight inches.

In addition, the cables between the chargers and the control circuits may be designed to meet UL standards. For example, these cables may include wire sized at #26 AWG and may be about four inches long. Any other suitable cable size and/or length may be employed including, for example, cable sizes of more or less than #26 AWG and cable lengths of more or less than four inches.

According to further aspects of the present disclosure, methods of heating one or more rechargeable batteries chargeable by a charger are disclosed. In an exemplary embodiment, a method generally includes sensing temperature adjacent the one or more rechargeable batteries, and allowing power to flow from the charger to a flexible heating element positioned about the one or more rechargeable batteries in response to the sensed temperature adjacent the one or more rechargeable batteries falling below a defined threshold temperature. The method may also include preventing the flow of power from the charger to the flexible heating element in response to the sensed temperature adjacent the one or more rechargeable batteries rising above the defined threshold temperature. Or, for example, the method may include preventing the flow of power from the charger to the flexible heating element in response to the sensed temperature adjacent the one or more rechargeable batteries rising above the defined threshold temperature or a second defined threshold temperature higher than the defined threshold temperature.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances. Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heating assembly for one or more rechargeable batteries, the heating assembly comprising:
   a flexible heating element positionable about the one or more rechargeable batteries and configured to receive power from a charger operable for charging the one or more rechargeable batteries;
   a temperature sensor configured to sense a temperature adjacent the one or more rechargeable batteries, the temperature sensor adjacent the flexible heating element; and
   a control circuit configured to receive the sensed temperature from the temperature sensor and connect the charger to the flexible heating element for allowing power to flow from the charger to the flexible heating element in response to the sensed temperature adjacent the one or more rechargeable batteries falling below a defined threshold temperature;
   wherein the flexible heating element includes a polyimide insulated heater.

2. A heating assembly for one or more rechargeable batteries, the heating assembly comprising:
   a flexible heating element positionable about the one or more rechargeable batteries and configured to receive power from a charger operable for charging the one or more rechargeable batteries;
   a temperature sensor configured to sense a temperature adjacent the one or more rechargeable batteries, the temperature sensor adjacent the flexible heating element;
   a control circuit configured to receive the sensed temperature from the temperature sensor and connect the charger to the flexible heating element for allowing power to flow from the charger to the flexible heating element in response to the sensed temperature adjacent the one or more rechargeable batteries falling below a defined threshold temperature; and
   at least one heat spreader adjacent the flexible heating element.

3. The heating assembly of claim 2, wherein the at least one heat spreader is adjacent to one side of the flexible heating element.

4. A heating assembly for one or more rechargeable batteries, the heating assembly comprising:
   a flexible heating element positionable about the one or more rechargeable batteries and configured to receive power from a charger operable for charging the one or more rechargeable batteries;
   a temperature sensor configured to sense a temperature adjacent the one or more rechargeable batteries, the temperature sensor adjacent the flexible heating element; and
   a control circuit configured to receive the sensed temperature from the temperature sensor and connect the charger to the flexible heating element for allowing power to flow from the charger to the flexible heating element in response to the sensed temperature adjacent the one or more rechargeable batteries falling below a defined threshold temperature;
   wherein the temperature sensor includes a surface mount device.

5. A heating assembly for one or more rechargeable batteries, the heating assembly comprising:
   a flexible heating element positionable about the one or more rechargeable batteries and configured to receive power from a charger operable for charging the one or more rechargeable batteries;
   a temperature sensor configured to sense a temperature adjacent the one or more rechargeable batteries, the temperature sensor adjacent the flexible heating element; and
   a control circuit configured to receive the sensed temperature from the temperature sensor and connect the charger to the flexible heating element for allowing power to flow from the charger to the flexible heating element in response to the sensed temperature adjacent the one or more rechargeable batteries falling below a defined threshold temperature;
   wherein:
   the flexible heating element includes a first side, a second side opposing the first side, and a center portion between the first side and the second side; and
   the temperature sensor is adjacent the center portion of the flexible heating element.

6. The heating assembly of claim 5, wherein the control circuit is configured to disconnect the charger from the flexible heating element in response to the sensed temperature adjacent the one or more rechargeable batteries rising above the defined threshold temperature.

7. The heating assembly of claim 5, wherein:
   the defined threshold temperature is a first defined threshold temperature; and
   the control circuit is configured to disconnect the charger from the flexible heating element in response to the sensed temperature adjacent the one or more rechargeable batteries rising above a second defined threshold temperature higher than the first defined threshold temperature.

8. The heating assembly of claim 5, wherein:
   the defined threshold temperature is about negative five degrees Celsius; or the defined threshold temperature is about zero degrees Celsius; or the defined threshold temperature is between about negative five degrees Celsius and about zero degrees Celsius.

9. The heating assembly of claim 5, further comprising a case for retaining the control circuit.

10. The heating assembly of claim 9, wherein the control circuit is potted in the case.

11. A heating assembly for one or more rechargeable batteries, the heating assembly comprising:
a flexible heating element positionable about the one or more rechargeable batteries and configured to receive power from a charger operable for charging the one or more rechargeable batteries;
a temperature sensor configured to sense a temperature adjacent the one or more rechargeable batteries, the temperature sensor adjacent the flexible heating element; and
a control circuit configured to receive the sensed temperature from the temperature sensor and connect the charger to the flexible heating element for allowing power to flow from the charger to the flexible heating element in response to the sensed temperature adjacent the one or more rechargeable batteries falling below a defined threshold temperature;
wherein the temperature sensor includes a protective coating.

12. A system comprising:
one or more rechargeable batteries;
a flexible heating element positionable about the one or more rechargeable batteries;
a temperature sensor configured to sense a temperature adjacent the one or more rechargeable batteries, the temperature sensor adjacent the flexible heating element;
a charger configured to provide power to the one or more rechargeable batteries and the flexible heating element;
a control circuit configured to receive the sensed temperature from the temperature sensor and connect the charger to the flexible heating element to thereby allow power to flow from the charger to the flexible heating element in response to the sensed temperature adjacent the one or more rechargeable batteries falling below a defined threshold temperature;
wherein:
the system further comprises at least one heat spreader adjacent to one side of the flexible heating element; and/or
the system further comprises case for retaining the control circuit, and the control circuit is potted in the case; and/or
the temperature sensor includes a surface mount device; and/or
the defined threshold temperature is about negative five degrees Celsius, about zero degrees Celsius, or between about negative five degrees Celsius and about zero degrees Celsius.

13. The system of claim 12, wherein:
at least two of the one or more rechargeable batteries are grouped to form a battery pack; and
the flexible heating element is positionable about the battery pack.

14. The system of claim 12, wherein the control circuit is configured to disconnect the charger from the flexible heating element in response to the sensed temperature adjacent the one or more rechargeable batteries rising above the defined threshold temperature.

15. The system of claim 12, wherein:
the defined threshold temperature is a first defined threshold temperature; and
the control circuit is configured to disconnect the charger from the flexible heating element in response to the sensed temperature adjacent the one or more rechargeable batteries rising above a second defined threshold temperature higher than the first defined threshold temperature.

16. The system of claim 12, wherein the control circuit is coupled in series between the charger and the one or more rechargeable batteries.

17. The system of claim 12, wherein the one or more rechargeable batteries are arranged in two or more rows, and the flexible heating element is positioned between at least two of the two or more rows.

18. The system of claim 12, wherein the flexible heating element is wrapped about the one or more rechargeable batteries.

19. The system of claim 12, wherein the flexible heating element is interwoven between the one or more rechargeable batteries.

20. A system comprising:
one or more rechargeable batteries;
a flexible heating element positionable about the one or more rechargeable batteries;
a temperature sensor configured to sense a temperature adjacent the one or more rechargeable batteries, the temperature sensor adjacent the flexible heating element;
a charger configured to provide power to the one or more rechargeable batteries and the flexible heating element;
a control circuit configured to receive the sensed temperature from the temperature sensor and connect the charger to the flexible heating element to thereby allow power to flow from the charger to the flexible heating element in response to the sensed temperature adjacent the one or more rechargeable batteries falling below a defined threshold temperature;
wherein:
the flexible heating element is a first flexible heating element;
the one or more rechargeable batteries is a first set of rechargeable batteries;
the system further comprises a second flexible heating element positionable about a second set of rechargeable batteries; and
the control circuit is configured to connect the charger to the second flexible heating element to thereby allow power to flow from the charger to the second flexible heating element in response to the sensed temperature falling below the defined threshold temperature.

* * * * *